United States Patent
Zur et al.

(10) Patent No.: US 9,415,331 B2
(45) Date of Patent: Aug. 16, 2016

(54) SCREEN-TYPE FILTER ELEMENT INCLUDING FILTER ASSEMBLY WITH FINE AND COARSE MESH SCREEN SHEET MATERIAL LAYERS SELECTIVELY PENETRATED BY INTEGRALLY ATTACHED PLASTIC ENVELOPING RIBS

(75) Inventors: Boaz Zur, DN Bikat Beit Hakerem (IL); Shahar Nuriel, Yesud HaMa'ala (IL); Ruven Shtekelmacher, D.N. Upper Gallilee (IL); Yitzhak Sabag, Mishmar Hayarden (IL); Ami Kotler, Metula (IL); Simeon Shraer, Tzfat (IL); Yuval Shamir, D.N. Upper Gallilee (IL)

(73) Assignee: Amiad Water Systems Ltd., D.N. Upper Galil (IL)

( * ) Notice: Subject to any disclaimer, the term of this patent is extended or adjusted under 35 U.S.C. 154(b) by 5 days.

(21) Appl. No.: 13/582,144

(22) PCT Filed: Mar. 1, 2011

(86) PCT No.: PCT/IL2011/000205
§ 371 (c)(1),
(2), (4) Date: Aug. 31, 2012

(87) PCT Pub. No.: WO2011/107986
PCT Pub. Date: Sep. 9, 2011

(65) Prior Publication Data
US 2013/0008847 A1  Jan. 10, 2013

Related U.S. Application Data

(60) Provisional application No. 61/309,085, filed on Mar. 1, 2010.

(51) Int. Cl.
*A47J 43/22* (2006.01)
*B01D 27/00* (2006.01)
*B01D 29/11* (2006.01)
*F02M 37/22* (2006.01)

(52) U.S. Cl.
CPC ...... *B01D 29/111* (2013.01); *B01D 2201/0415* (2013.01)

(58) Field of Classification Search
None
See application file for complete search history.

(56) References Cited

U.S. PATENT DOCUMENTS 3,457,339 A * 7/1969 Pall et al. ............... 264/162
3,747,770 A * 7/1973 Zentis ..................... 210/402

(Continued)

FOREIGN PATENT DOCUMENTS

CN 1067291 6/2001
EP 1249261 10/2002

OTHER PUBLICATIONS

International Search Report from PCT International Application No. PCT/IL2011/000205 dated Sep. 7, 2011.

*Primary Examiner* — Dirk Bass
*Assistant Examiner* — Hayden Brewster
(74) *Attorney, Agent, or Firm* — Dorsey & Whitney LLP

(57) ABSTRACT

The disclosed subject matter is concerned with a screen-type filter element, and a method for its manufacture. The screen type filter comprises a substantially rigid screen-bearing skeleton and at least one fine screen sheet material extending within or over the skeleton and secured thereto by a plurality of enveloping ribs, the enveloping ribs being applied over one face of the filter screen sheet to thereby support it at discrete portions and secure it to the skeleton.

20 Claims, 8 Drawing Sheets

(56) References Cited

U.S. PATENT DOCUMENTS

| | | | |
|---|---|---|---|
| 4,929,354 A * | 5/1990 | Meyering et al. | 210/321.61 |
| 4,999,038 A * | 3/1991 | Lundberg | 55/491 |
| 5,279,733 A * | 1/1994 | Heymans | 210/232 |
| 5,310,482 A * | 5/1994 | Sather | 210/485 |
| 5,427,679 A * | 6/1995 | Daniels | 210/170.08 |
| 5,725,784 A | 3/1998 | Geibel et al. | |
| 7,438,812 B2 | 10/2008 | Denton et al. | |
| 2002/0108896 A1 * | 8/2002 | Malkin | 210/232 |

\* cited by examiner

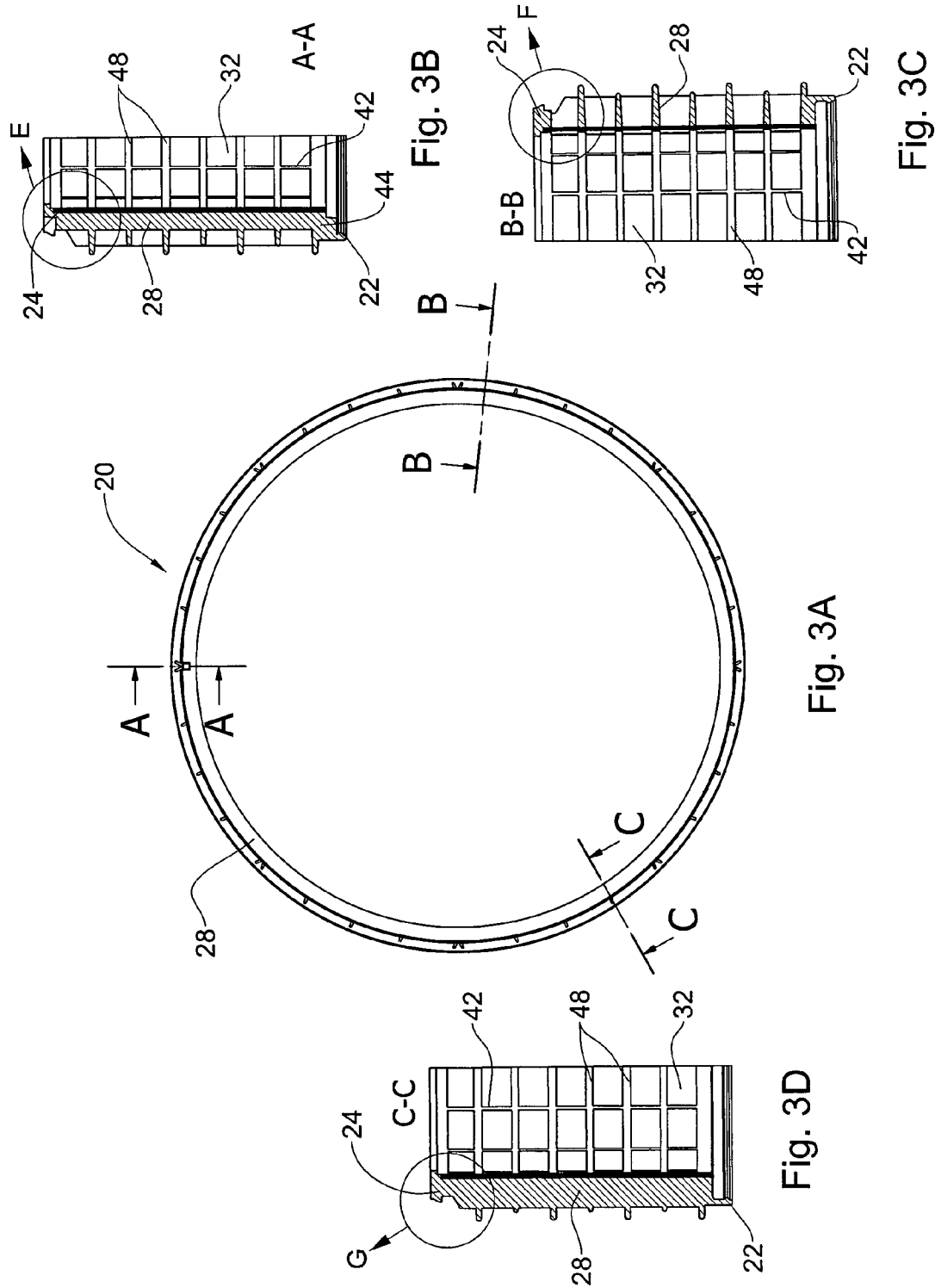

SCREEN-TYPE FILTER ELEMENT INCLUDING FILTER ASSEMBLY WITH FINE AND COARSE MESH SCREEN SHEET MATERIAL LAYERS SELECTIVELY PENETRATED BY INTEGRALLY ATTACHED PLASTIC ENVELOPING RIBS

FIELD OF INVENTION

This invention relates to filtering elements and their manufacture. More particularly the disclosed subject matter is considered with screen-type filter elements.

The term screen as used herein denotes any form of porous sheet material configured for removing suspended material while allowing a carrying fluid to flow therethrough, comprising fabric, plastic material, metal, etc, whether woven, or molded, or non-woven or otherwise manufactured.

BACKGROUND OF INVENTION

Screen filters, and other sheet-based filters, are simple and economical and are thus widely used for separation of suspended particles from a fluid. Screen filters may be made of metal, plastic or synthetic cloths, secured to a substantially rigid skeleton element receivable within the filter housing.

Filtering screens are classified according to their filtration degree, defined by the diameter of the largest sphere that may pass the screen. A different indirect way to define a filtration degree is by the number of wires per inch or per cm (in case of a woven screen) referred to as 'mesh'.

Where fine filtration is required, it is common to use backup, coarser filtering sheets, to support the fine screen. Sometimes these backup layers are used to perform pre-filtration to reduce the particle load on the fine screen. On different occasions these coarse layers are used to enable filtrate flow between conjugate layers parallel to the layers. The last filtration stage is always the fine screen filter layer. In addition, one or more layers may serve as spacers between neighboring layers to enable fluid flow outside the element.

In case of a metal screen and a metal cage, attachment therebetween may be facilitated by welding or otherwise fastening. However attaching the screen sheet to the filter element cage (skeleton) where the cage is made of plastic material or coated by plastic material is by applying heat to the plastic material to thereby melt its surface engaging the screen resulting in condensation of melted plastic material into the openings of the screen whereupon the screen attaches to the filter element skeleton.

However, the above method may be carried out only in case of a screen made of heat weldable material which can be plastic welded to the filter element cage/skeleton, or where the openings of the screen are sufficiently large to facilitate molten plastic flow into the openings, to thereby engage to the skeleton of the filter element.

SUMMARY OF INVENTION

The disclosed subject matter is concerned with a screen-type filter element and its manufacturing. Whilst the disclosed subject mater is disclosed in connection with substantially fine mesh screens, it is appreciated that the device and method disclosed for manufacturing same may be facilitated also in connection with less fine mesh screens.

By the broad aspect of the present disclosed subject matter there is provided a screen filter element comprising a substantially rigid screen bearing skeleton and at least one fine screen sheet material extending within or over the skeleton and secured thereto by a plurality of enveloping ribs, applied over one face of the filter screen sheet to thereby support it at discrete portions and secure it to the skeleton.

The enveloping ribs may be part of the skeleton material melted to thereby constitute the enveloping ribs, or the enveloping ribs may be made of material applied over the sheet material and attached to the skeleton material by bonding, adhering, etc.

One or more of the enveloping ribs may be constituted by a series of isolated connection points either forming part of the molten skeleton material or made of material applied over the sheet material and attached to the skeleton material by bonding, adhering, etc.

According to one example the screen filter element comprising a substantially rigid screen bearing skeleton (cage) made of, or at least partially coated, with heat or chemically meltable material, and at least a fine mesh screen sheet material secured to the skeleton with one face facing the skeleton, such that portions thereof are enveloped by skeleton material by melting same and allowing it to flow over an opposite face of the screen sheet material.

Any one or more of the following features and designs may be incorporated in connection with the device and method subject of the present disclosed subject matter:

- the disclosed subject method may be applied to a filter screen made of any material (such as plastic, metal, fabric-woven or non-woven, etc.), and is not restricted to any particular size of the screen mesh;
- the filter element may be configured in any required shape and size;
- the filter element may comprise more than one layer of screen sheet material, to thereby support and protect a fine layer of screen material. The fine mesh screen layer may be positioned at any tier, e.g. between two layers of rougher sheet material formed with a more coarse mesh. The different layers may be made of different material and may differ in their porosity;
- a second screen sheet of larger mesh may be provided, supporting the fine mesh-screen sheet and bearing against the opposite face of the fine mesh sheet, and where molten skeleton material or other enveloping rib material, flows into the openings of the second mesh sheet;
- the screen sheet layer may be externally or internally articulated to the skeleton;
- the enveloping rib portions extend at least in an axial direction. The enveloping portions may extend also at warp and weft patterns with intersections;
- an inside surface of an inner-most screen layer (i.e. corresponding with the opposite face of the fine mesh sheet) is substantially smooth, i.e. the enveloping portions are smooth and substantially do not project from the inner surface. This is important for performing cleaning of the filter element by suction or jet cleaning.
- at least one enveloping portion of the filter element is equidistant from the fine screen. This arrangement is important to facilitate cleaning of the filter element (by either suction or jet cleaning), and it is thus important that the surface of the enveloping portion extends at a substantial constant distance from the inner/outer surface.
- the enveloping portions substantially correspond with narrow ribs of the screen bearing skeleton, whereby the effective filtering screen area is substantially not effected;

the filter element may be formed with two ring edges and whereby the molten material of the skeleton axially extends between the two end rings;

axially extending end edges of the sheet material are joined (e.g. by stitching, adhering, welding, etc.) and the join line extends behind an enveloping axial rib;

the end rings of the filter element are designed for coupling in a substantially seal-tight fashion with the filter housing. The end rings are designed also for axial co-extension with like filter elements.

BRIEF DESCRIPTION OF THE DRAWINGS

In order to understand the invention and to see how it may be carried out in practice, embodiments will now be described, by way of a non-limiting example only, with reference to the accompanying drawings, in which:

FIG. 3A is a planer view of the screen filter element of FIG. 1;

FIGS. 3B to 3D are sections taken along lines A-A, B-B and C-C respectively, in FIG. 3A;

DETAILED DESCRIPTION OF EMBODIMENTS

Figure 1:
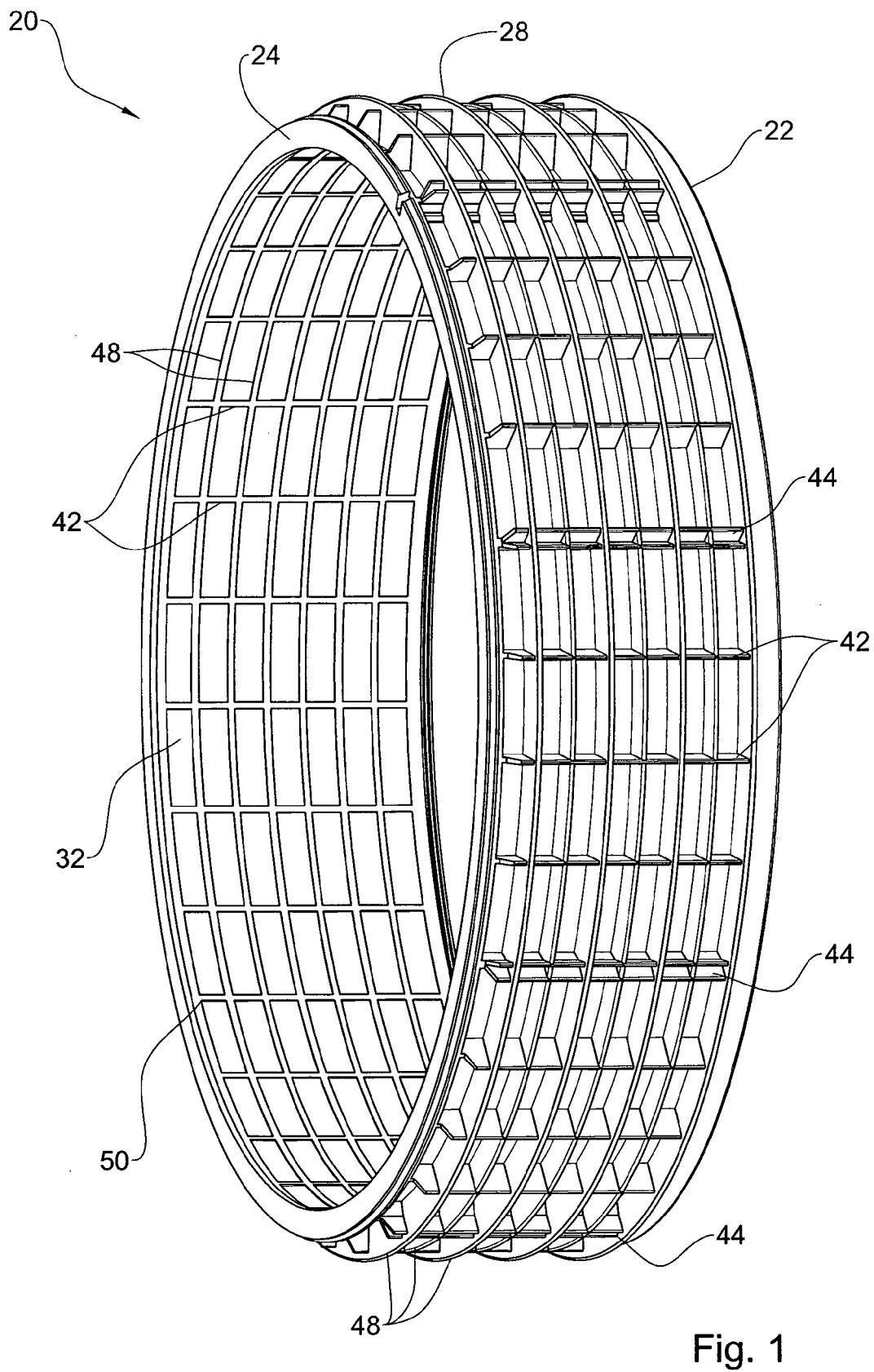
FIG. 1 is an isometric view of a screen filter element according to the present disclosed subject matter.

Attention is directed to the drawings illustrating a screen-type filter element generally designated 20. The filter element 20 is designed for use in conjunction with a fluid filter unit (not shown) comprising a housing accommodating the filter element, and further configured with a fluid flow path extending between a fluid inlet and a fluid outlet and necessarily passing through the screen layer of the filter element. In the present example the fluid flow path extends radially through the filter element and more particularly the flow path is oriented radially outwards.

Figure 2:
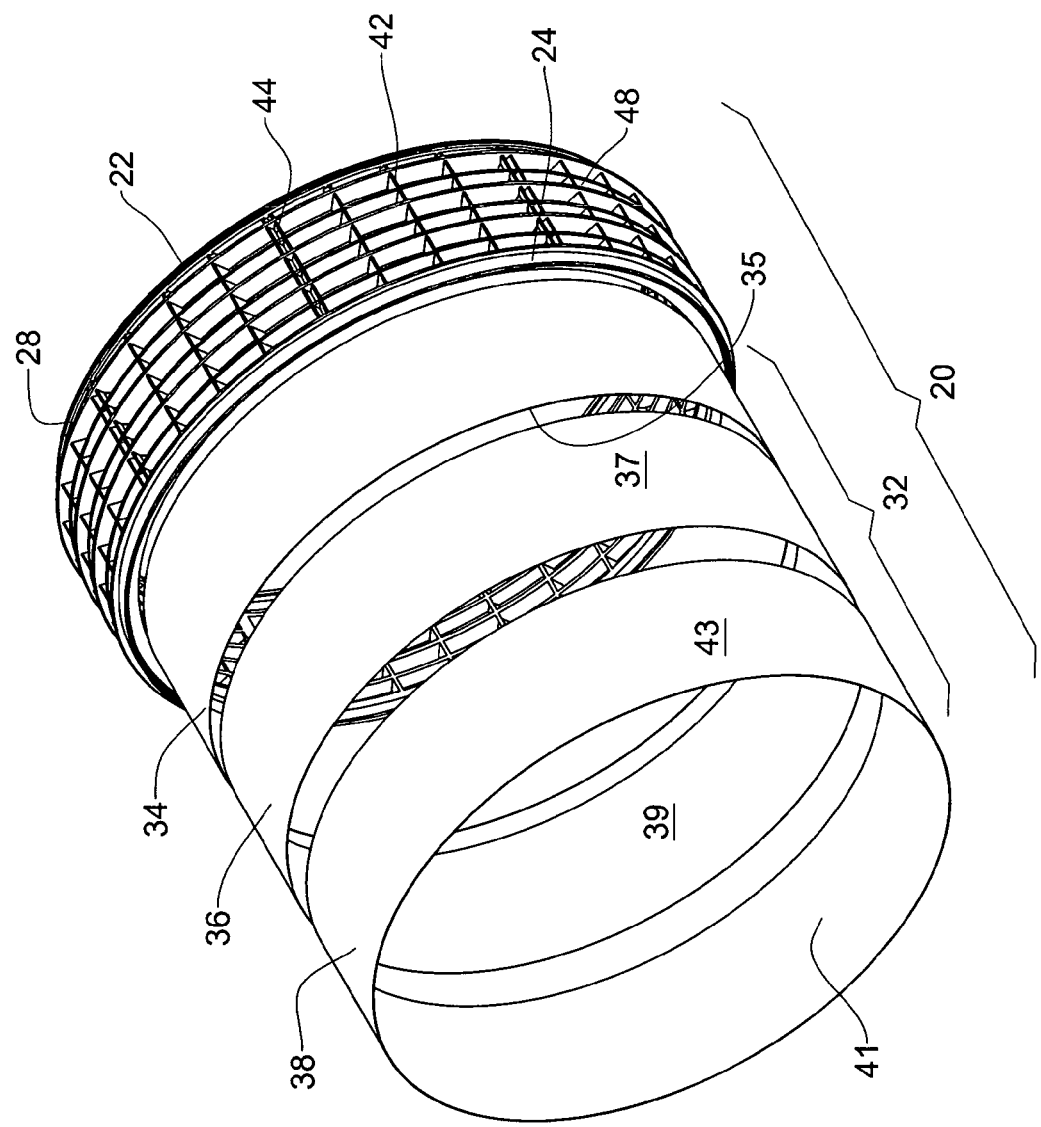
FIG. 2 is an exploded isometric view of the screen filter element of FIG. 1.

The filter element 20 is in the form of a cylinder and comprises a skeleton-like skeleton 28 made of rigid plastic material (though according to other examples it may be made of other material however with at least portions thereof made of or coated with plastic material) and a filter screen assembly 32 integrated thereto, which as can be seen in FIG. 2 is composed of three screen sheet layers 34, 36 and 38. In the present example the intermediate screen layer 36 is a fine mesh screen (e.g. in the range of about 1 to 40 μm, and more likely about 10 μm), whilst the outermost screen 34 and the innermost screen 38 are of larger mesh (e.g. in the range of about 50 to 2000 μm and more likely about 500 μm). It is appreciated that at least the apertures of the intermediate screen layer 36 are so tight to the extent that even molten plastic material or a liquid adhering/bonding agent, will not penetrate therethrough.

The filter element 20 extends between a first end ring 22 and a second end ring 24, said end rings configured for sealing engagement with respective filter element seats of the housing (not shown). The skeleton 28 is made of rigid plastic material (though according to other examples it may be made of other material however with at least portions thereof made of or coated with plastic material), said material being meltable under heat and will cure fast after cooling.

The skeleton 28 comprises a plurality of axially extending ribs 42 and axially extending reinforced ribs 44, said ribs 42 and reinforced ribs 44 extending parallely to one another and extending between the first end ring 22 and the second end ring 24. A plurality of circumferential ribs 48 which intersect the axial ribs, giving rise to the rigid skeleton-like structure of the skeleton 28.

It is appreciated that the inner surface of all the ribs 42, 44, and 48 coextend and are flush with the inside surface 50 of the filter element.

Figure 4A:
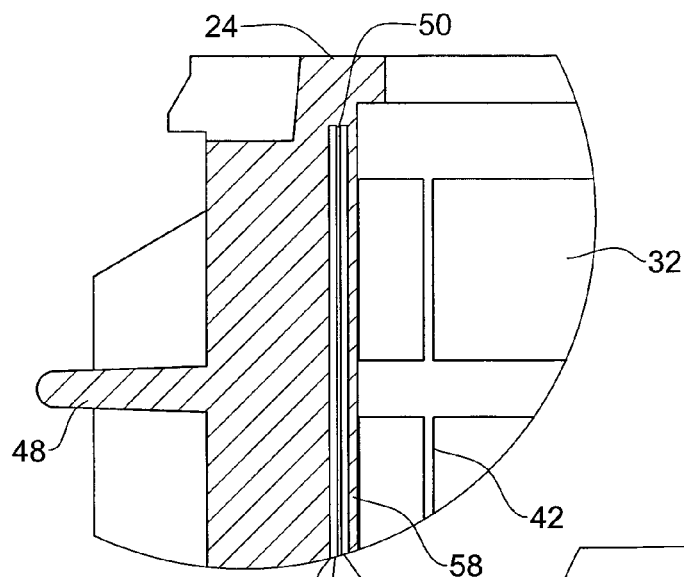
FIGS. 4A to 4C are enlargements of the portions marked E, F and G, respectively, in FIGS. 3B to 3D.
Figure 4B:
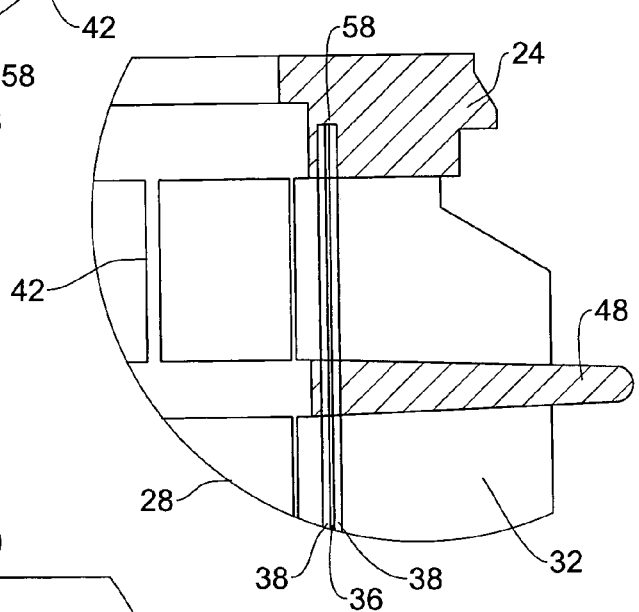
Figure 4C:
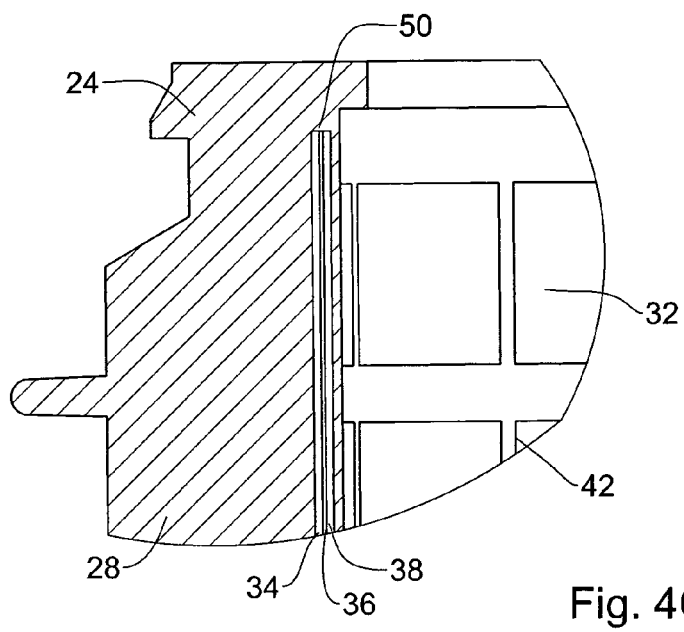
Figure 5A:
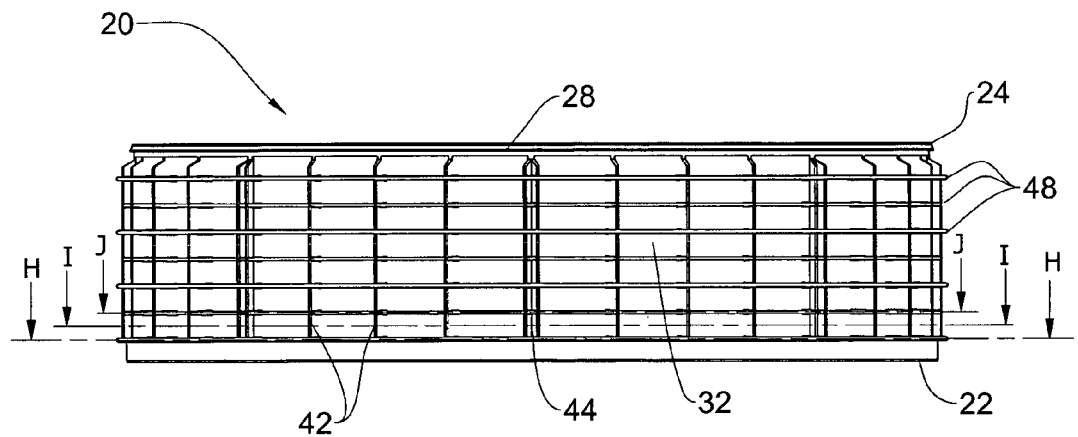
FIG. 5A is a top view of the screen filter element of FIG. 1.
Figure 5B:
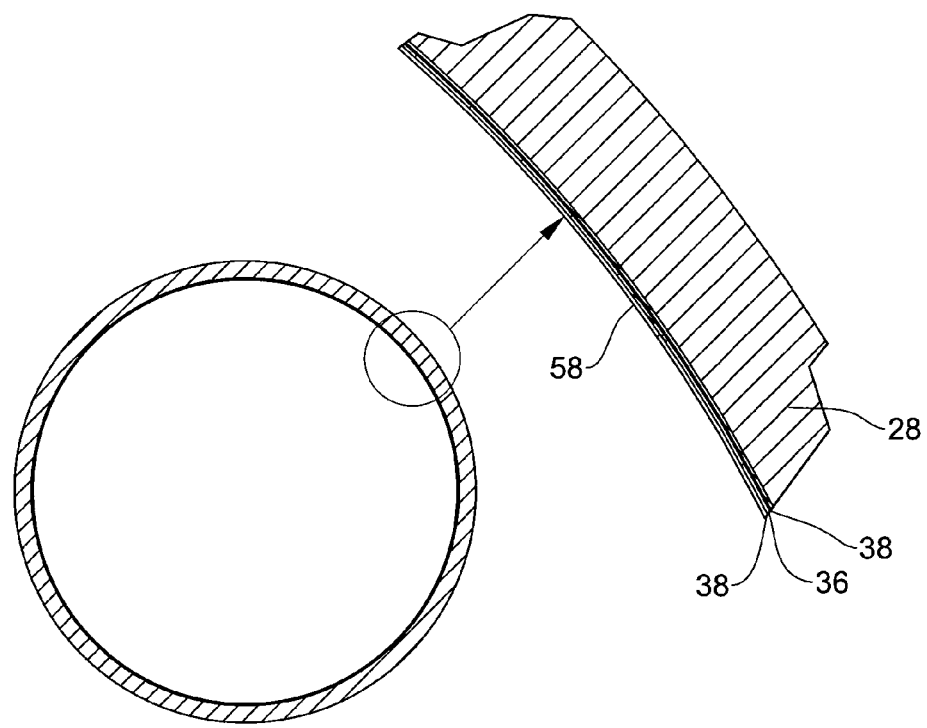
FIGS. 5B to 5D are sections taken along lines H-H, I-I and J-J respectively, in FIG. 5A, and their respective enlarged portions.
Figure 5C:
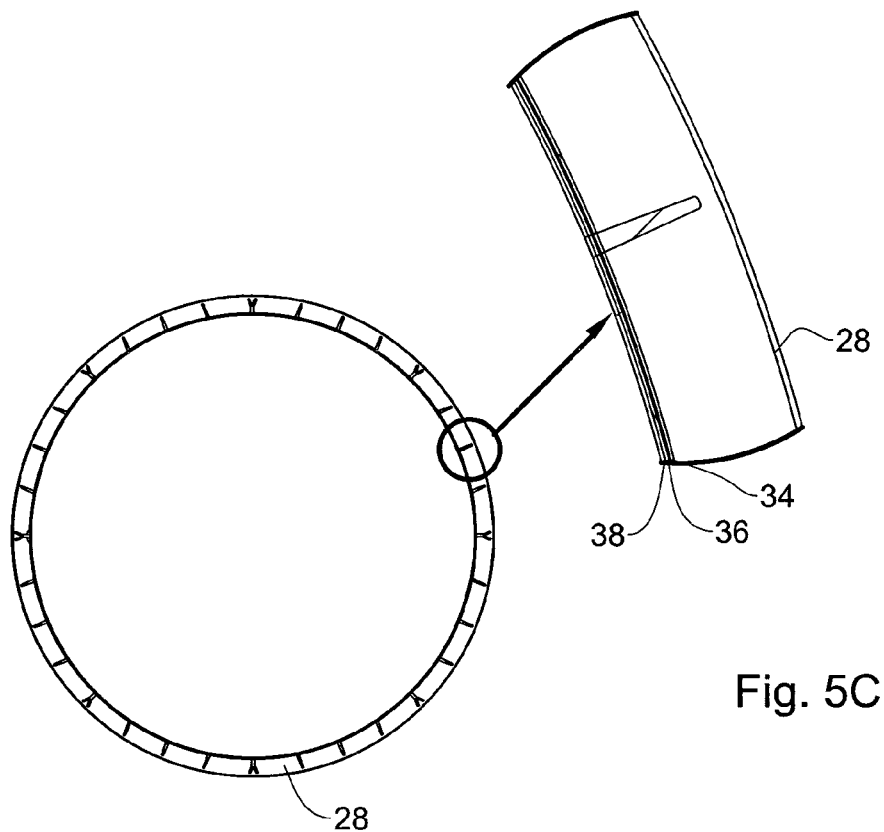
Figure 5D:
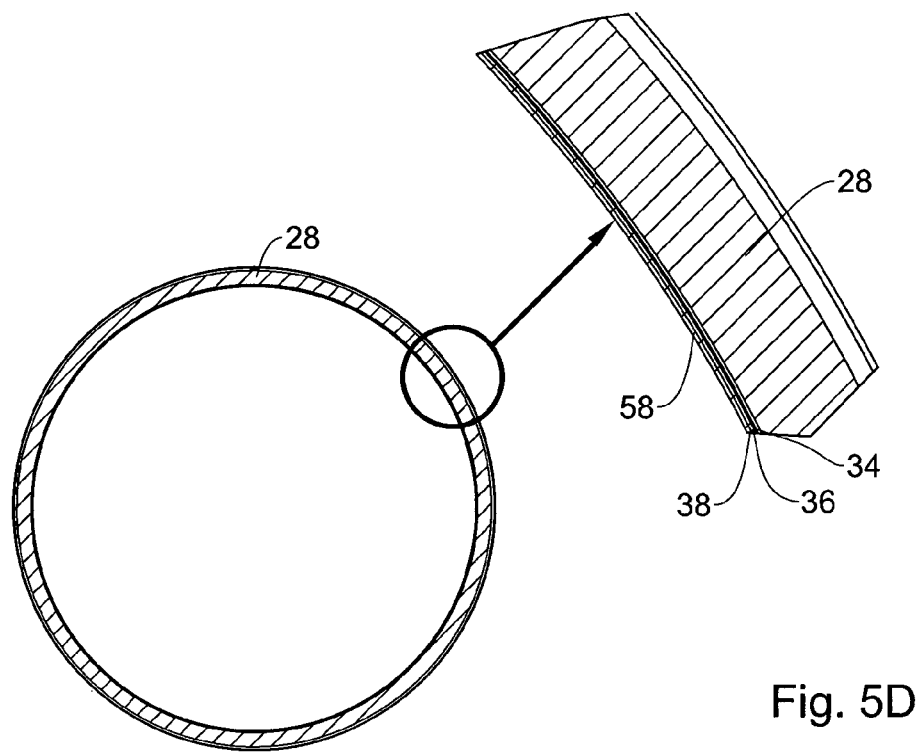

Further attention is now directed to FIGS. 3 to 5 for better understanding the structure of the filter element 20.

It is noted that in fact the fine mesh screen layer 36 is not attached to the skeleton 28 but rather is sandwiched between the support sheets 34 and 38 such that the outer face 37 bears against an inside surface 35 of external support sheet layer 34, with inside face 39 supported over the external surface 43 of the inner support sheet 38.

The filtering sheet assembly 32 is enveloped and secured to the skeleton 28 wherein the inner support sheet 38 becomes attached by cured molten skeleton material enveloping it and extending into its mesh openings.

As mentioned above, the filtering sheet assembly 32 is unified prior to applying to the skeleton, and it is so positioned that a seam line extends axially, parallel to and flush behind an axial reinforced support rib 44 of the skeleton 28.

Manufacturing of a filter element as disclosed herein above may take place in different ways. According to one manufacturing method, the unified filtering sheet assembly 32 is placed over a support core-member formed with a plurality of flow channels formed over its surface (circumferentially and axially oriented), wherein said canals substantially correspond with outside canals formed in the mold (eventually forming the skeleton ribs). The skeleton is then molded over the core-member and the filtering sheet assembly, thus forming the skeleton and allowing molten plastic material to flow along the flow channels of the support core member, resulting in generating the enveloping ribs 42, 44 and 48, thus securing the filtering sheet assembly 32 to the skeleton 28.

According to a modification of the above disclosure, the core member is substantially smooth over its surface, i.e. devoid of any channels.

According to another method, the skeleton 28 is first molded and the filtering sheet assembly 32 is then applied within the skeleton 28 with a suitable support core member fitted for supporting the filtering sheet assembly 32 tightly against the skeleton 28, with flow channels formed over the surface of said support core member. Then, heat melts plastic material at regions of the end ring 22 and the second end ring 24 of the skeleton and flows along the flow channels of the support core member, resulting in generating the enveloping ribs 42, 44 and 48, thus securing the filtering sheet assembly 32 to the skeleton 28.

As noted in the drawings, the molten plastic material flows over surface 41 of the innermost screen sheet layer 38. The molten material (designated 58 and best noticeable in the enlarged views) will also occupy the fine openings (pores) of the coarse screen sheet layer 38, increasing grip to the skeleton 28. However, it is appreciated that layer 50 is very thin such that it is hardly noticeable, if at all, over the inside surface 41

According to yet another example, the skeleton is first manufactured, typically in a plastic molding process. And then the filtering mesh assembly is placed within the skeleton over a suitable support core member fitted for supporting the filtering sheet assembly 32 tightly against the skeleton 28, with flow channels formed over the surface of said support core member. Then a bonding agent is applied and is caused to flow along the flow channels of the support core member, resulting in generating the enveloping ribs 42 and 48 and their integration with the end rings of the skeleton, thus securing the filtering sheet assembly 32 to the skeleton 28.

It is noted that the effective filtration section area of the filter element is not affected by the method disclosed herein since the enveloping material extend opposite the ribs of the skeleton.

In the exemplified illustrations the filtering sheet assembly is internal to the skeleton, however according to a different configuration, not illustrated, the filtering assembly may be external to the skeleton, wherein the flow path is in an opposite direction, (i.e. radially inwards).

Figure 6A:
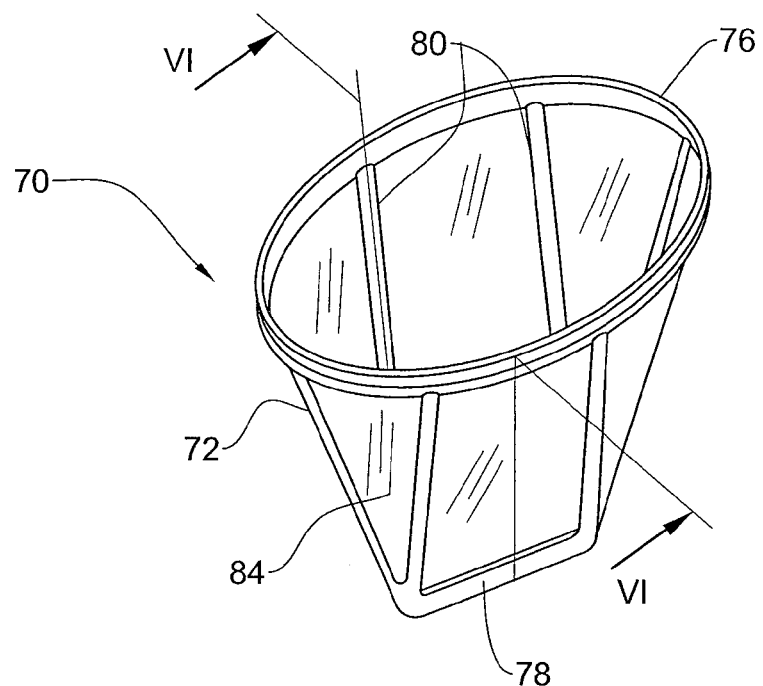
FIG. 6A is an isometric view of a tapering filtering element.
Figure 6B:
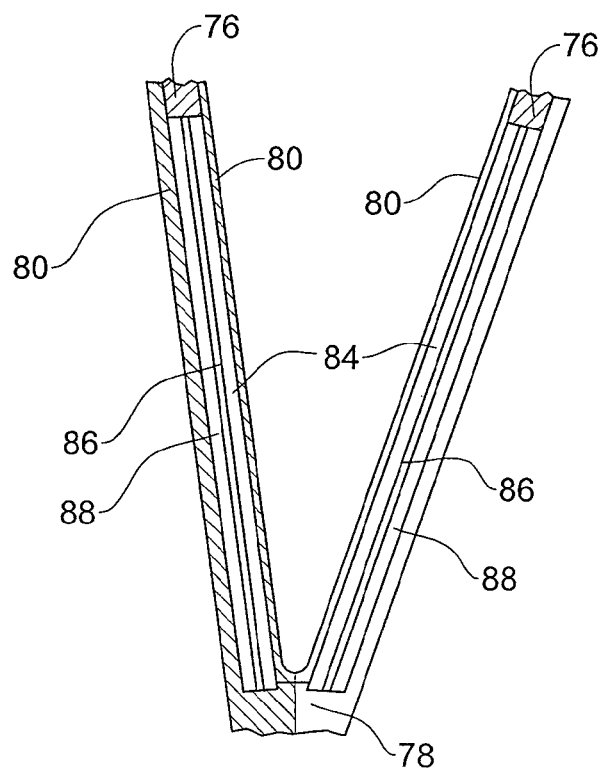
FIG. 6B is a section taken along line IV-IV in FIG. 6A.

Further attention is now directed to FIGS. 6A and 6B directed to a tapering, triangular sectioned filter element generally designated 70 comprising a structure skeleton 72 configured with a top base ring 76 and a bottom ridge 78 interconnected to one another by axial support ribs 80. A filter screen assembly 84 is integrated to the skeleton 72, and as can be seen in FIG. 6B is composed of three screen sheet layers 84, 86 and 88.

It is noted that in fact the fine mesh screen layer 86 is not attached to the skeleton 70 but rather is sandwiched between the coarser support sheets 84 and 88 as disclosed in connection with the previous example, i.e. wherein molten plastic material extends only into the coarser support sheets 84 and 88.

Figure 7A:
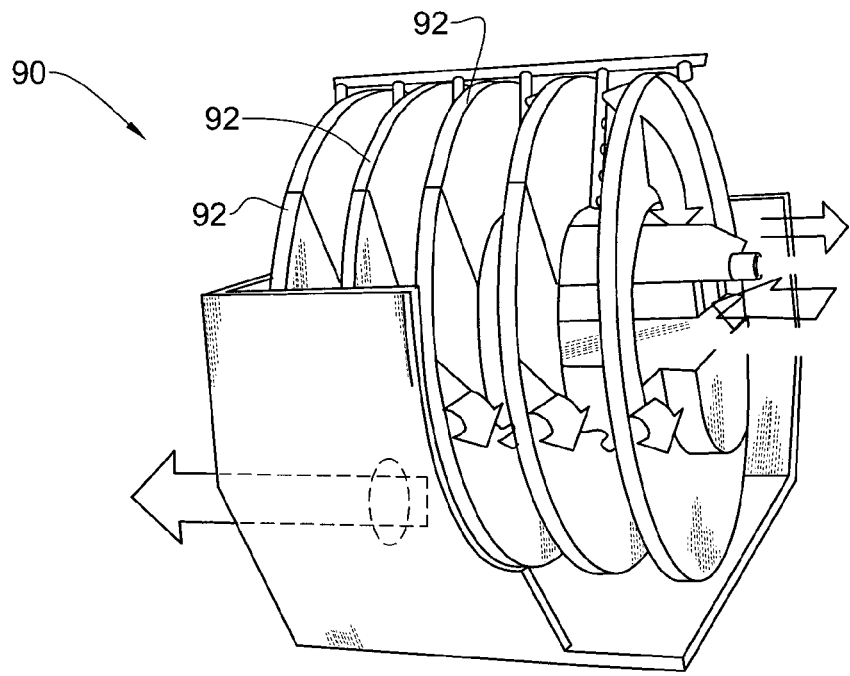
FIG. 7A is a schematic representation of a disc filtering assembly.

In FIG. 7A there is illustrated a disc filter assembly generally designated 90, comprising a plurality of disc-type filters 92. The discs 92 are stand alone in the particular example though according to other configurations the discs are interconnected in a helical pattern.

Figure 7B:
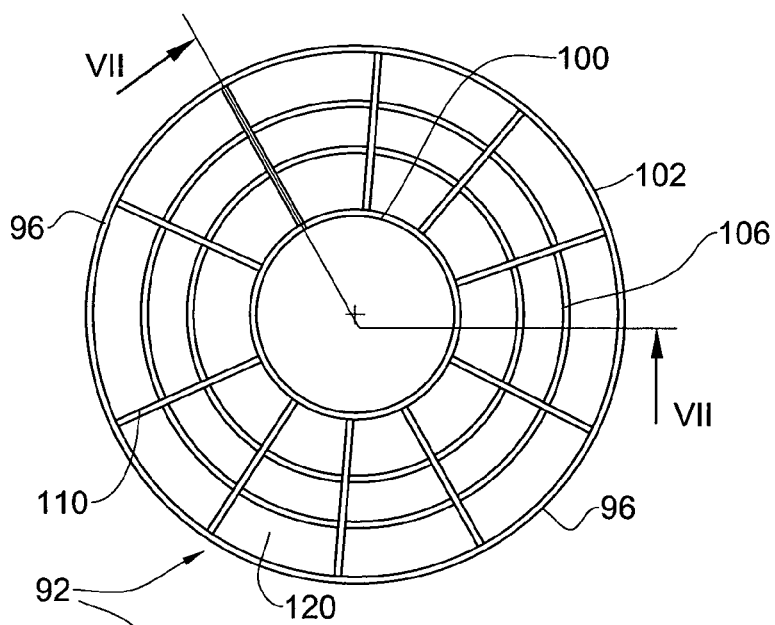
FIG. 7B is a planner view of a disc useful in a disc filtering assembly of FIG. 7A, however manufactured according to the disclosed subject matter.

Referring also to FIG. 7B, each filter element 92 is configured with a skeleton structure 96 comprising an inner annular ring 100 and an outer ring 102, with several coaxially extending annular support ribs (two in the present example) 106 and with a plurality of radially extending support ribs 110 interconnecting the annular ribs.

Figure 7C:
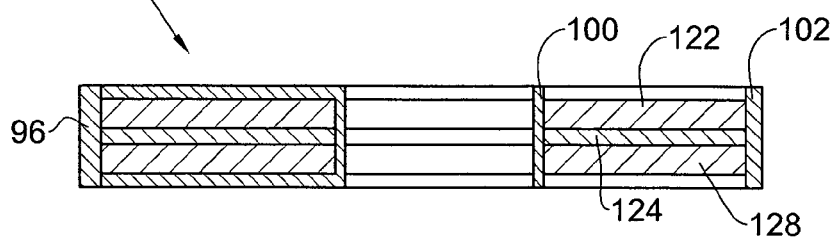
FIG. 7C is a sectioned view taken along line VII-VII in FIG. 7B.

A filter screen assembly 120 is integrated to the skeleton 96, and as can be seen in FIG. 7C is composed of three screen sheet layers 122, 124 and 128, of which layer 124 is the fine filter sheet.

It is noted that in fact the fine mesh screen layer 124 is not attached to the skeleton 96 but rather is sandwiched between the coarser support sheets 122 and 128 as disclosed in connection with the previous example, i.e. wherein molten plastic material extends only into the coarser support sheets 122 and 128.

It is appreciated that a filter element according to the disclosed subject matter comprises additional sheet layers, including one ore more coarse layers serving as spacers between neighboring layers to facilitate easy fluid flow therebetween.

Those skilled in the art to which this invention pertains will readily appreciate that numerous changes, variations, and modifications can be made without departing from the scope of the invention, mutatis mutandis. For example it is appreciated that other shapes of a filter element may be configured, or the one or more screen sheets may be secured to an outside surface of the skeleton.

The invention claimed is:

1. A screen-type filter element, comprising:
a substantially rigid screen-bearing skeleton including a plurality of enveloping ribs, at least some of the plurality of enveloping ribs having portions comprising plastic material integrally formed with the plurality of enveloping ribs; and
a filter screen assembly including:
at least one fine mesh screen sheet material layer including fine apertures; and
at least one coarse mesh screen sheet material layer including coarse apertures;
wherein the filter screen assembly is integrated with and attached to the substantially rigid screen-bearing skeleton through the portions comprising the plastic material of the plurality of enveloping ribs;
wherein the portions comprising the plastic material of the plurality of enveloping ribs penetrate through only a selected portion of the coarse apertures of the at least one coarse mesh screen sheet material layer and cover only a selected portion of at least one face of the at least one fine mesh screen sheet material layer, such that at least one face of the at least one coarse mesh screen sheet material layer bears against the at least one face of the at least one fine mesh screen sheet material layer to thereby support the at least one fine mesh screen sheet material layer;
wherein the substantially rigid screen-bearing skeleton is integrally formed with the at least one coarse mesh screen sheet material layer and bonded to the at least one fine mesh screen sheet material layer;
wherein the plurality of enveloping ribs support the filter screen assembly at discrete portions and secure the filter screen assembly to the substantially rigid screen-bearing skeleton.

2. The filter element, according to claim 1, wherein the plurality of enveloping ribs are part of the substantially rigid screen-bearing skeleton.

3. The filter element, according to claim 1, wherein the plurality of enveloping ribs are constituted by melted skeleton, or made of material applied over the filter screen assembly and attached to the skeleton material.

4. The filter element according to claim 1, wherein the plurality of enveloping ribs are either substantially continuous or substantially segmented.

5. The filter element according to claim 1, wherein at least one the at least one fine mesh screen sheet material layer or the at least one coarse mesh screen sheet material layer is made of at least one of plastic, metal, woven fabric, or non-woven fabric.

6. The filter element according to claim 1, further comprising more than one layer of the coarse mesh screen sheet material layer to thereby support and protect the at least one fine mesh screen sheet material layer.

7. The filter element according to claim 1, wherein the at least one fine mesh screen sheet material layer and at least one coarse mesh screen sheet material layer are made of different materials and differ in porosity.

8. The filter element according to claim 1, wherein the at least one fine mesh screen sheet material layer or the at least one coarse mesh screen sheet material layer is externally or internally articulated to the substantially rigid screen-bearing skeleton.

9. The filter element according to claim 1, wherein the enveloping rib portions extend at least in an axial direction.

10. The filter element according to claim 1, wherein the enveloping rib portions extend at warp and weft patterns with intersections.

11. The filter element according to claim 1, wherein at least one of the enveloping portions is substantially equidistant from the at least one fine mesh screen sheet material layer.

12. The filter element according to claim 1, wherein the enveloping portions substantially correspond with narrow ribs of the substantially rigid screen-bearing skeleton such that an effective filtering screen area is substantially not affected.

13. The filter element according to claim 1, wherein axially extending end edges of the at least one fine mesh and at least one coarse mesh screen sheet material layers are joined and a join line extends behind an enveloping axial rib.

14. A fluid filter unit comprising the filter element according to claim 1 and a housing configured for accommodating the filter element, and wherein the filter unit is configured with a fluid flow path extending radially through the filter element.

15. The fluid filter unit in accordance with claim 14, wherein the filter element comprises a filter screen assembly integrated thereto, composed of at least three screen sheet layers such that at least one intermediate screen layer is a fine mesh screen, whilst the outermost screen and the innermost screen are coarse mesh screens.

16. The fluid filter unit in accordance with claim 1, wherein the at least some of the plurality of enveloping ribs are formed entirely of the plastic material.

17. The fluid filter unit in accordance with claim 1, wherein the portions comprising the plastic material of the plurality of enveloping ribs penetrate only through the at least one coarse mesh screen sheet material layer and wherein the fine apertures of the at least one fine mesh screen sheet material are sized such that the plastic material of the portions does not penetrate the fine apertures.

18. The fluid filter unit in accordance with claim 1, wherein the at least one coarse mesh screen sheet material layer includes at least two coarse mesh screen sheet material layers between which the at least one fine mesh screen sheet material layer is disposed, and wherein the portions comprising the plastic material of the plurality of enveloping ribs penetrate only through the at least two coarse mesh screen sheet material layers.

19. The fluid filter unit in accordance with claim 1, wherein the portions comprising the plastic material of the plurality of enveloping ribs also penetrate through the fine apertures of the at least one fine mesh screen sheet material layer.

20. The fluid filter unit in accordance with claim 1, wherein the at least one face of the at least one fine mesh screen sheet material layer is an outer face and the at least one face of the at least one coarse mesh screen sheet material layer is an inner face.

* * * * *